US008286352B1

(12) United States Patent
Ray (10) Patent No.: US 8,286,352 B1
(45) Date of Patent: Oct. 16, 2012

(54) MODULAR ORNAMENTAL STRUCTURES

(76) Inventor: D. Leon Ray, Andrews, SC (US)

(*) Notice: Subject to any disclaimer, the term of this patent is extended or adjusted under 35 U.S.C. 154(b) by 1121 days.

(21) Appl. No.: 12/218,377

(22) Filed: Jul. 15, 2008

(51) Int. Cl.
*B21K 23/00* (2006.01)

(52) U.S. Cl. ............ 29/897.312; 29/897.31; 29/897.32; 29/897.34; 52/270; 52/284; 52/653.1; 52/656.9

(58) Field of Classification Search ............ 29/897, 29/897.3, 897.31, 897.312, 897.32, 897.34, 29/462, 524; 52/270, 284, 653.1, 656.9, 52/657
See application file for complete search history.

(56) References Cited

U.S. PATENT DOCUMENTS

| | | | |
|---|---|---|---|
| 4,372,092 A | 2/1983 | Lopez | |
| 4,388,874 A * | 6/1983 | Stone | 109/79 |
| 4,389,948 A * | 6/1983 | Sands et al. | 109/82 |
| 4,972,537 A | 11/1990 | Slaw, Sr. | |
| 6,247,286 B1 | 6/2001 | Heyns | |
| 6,477,816 B1 * | 11/2002 | Di Biase | 52/588.1 |
| 6,543,371 B1 | 4/2003 | Gardner | |
| 6,799,524 B2 | 10/2004 | Marks | |
| 6,941,715 B2 | 9/2005 | Potter | |
| 7,121,586 B2 * | 10/2006 | McNally | 280/797 |
| 7,137,800 B1 | 11/2006 | Longo | |
| 7,140,364 B1 | 11/2006 | Buffington | |
| 7,407,218 B1 * | 8/2008 | Pishock et al. | 296/186.1 |
| 7,418,806 B2 * | 9/2008 | Martineau et al. | 52/658 |
| 2003/0230038 A1 * | 12/2003 | Seavy | 52/270 |
| 2007/0262001 A1 | 11/2007 | Hansen et al. | |
| 2007/0266649 A1 | 11/2007 | Overmyer et al. | |
| 2007/0286688 A1 | 12/2007 | Bradley | |

* cited by examiner

*Primary Examiner* — David Bryant
*Assistant Examiner* — Ryan J Walters
(74) *Attorney, Agent, or Firm* — P. Jeff Martin; The Law Firm of P. Jeffrey Martin, LLC

(57) ABSTRACT

A plurality of framework supporting decorative panels. The framework is interconnected collectively so as to form a modular, ornamental, closed plane structure.

10 Claims, 7 Drawing Sheets

MODULAR ORNAMENTAL STRUCTURES

RELATED APPLICATIONS

There are no previously filed, nor currently any co-pending applications, anywhere in the world.

BACKGROUND OF THE INVENTION

1. Field of the Invention

This application discloses and claims embodiments generally related to prefabricated modular structures, and more particularly, to modular ornamental structures and methods for constructing the same.

2. Description of the Related Art

There are a number of different types of modular concrete structures, such as buildings, walls for buildings, retaining walls, vaults for storing safety deposit boxes and reserve money, fireplaces, and the like. Most of these structures are formed of concrete and/or metal, many of which are made up of a series of standard and non-standard panels, and contiguous individual piles or panels to form a continuous structure. Common methods of fabricating the panels or piles is by using a fixed mold which typically contains reinforcement elements that become part of the cast product and impart additional tensile strength to the cast concrete. The panels are assembled by incorporating assemblage methods and devices which include locking mechanisms integrated with a raceway system, ram-lock and cam-lock devices, adjacent panels welded together, connective frame members, and interlocking joint structures.

However, the art does not appear to disclose the combination of features disclosed herein, specifically, a plurality of framework supporting decorative panels, the framework interconnected collectively so as to form a modular ornamental structure.

Accordingly, a need has arisen for modular ornamental structures and methods for constructing the same. The development of the modular ornamental structure fulfills this need.

A search of the prior art did not disclose any patents that read directly on the claims of the instant invention; however, the following references were considered related.

U.S. Pat. No. 4,372,092, issued in the name of Lopez discloses a precast modular panel suitable for forming at least a portion of a wall or other part of a building.

U.S. Pat. No. 6,247,286 B1, issued in the name of Heyns discloses a modular structural element which can serve as a floor, wall or ceiling.

U.S. Pat. No. 6,543,371 B1, issued in the name of Gardner discloses an improved modular vault panel.

U.S. Pat. No. 6,799,524 B2, issued in the name of Marks discloses modular security vault panels.

U.S. Pat. No. 6,941,715 B2, issued in the name of Potter discloses a prefabricated modular building component.

U.S. Patent Application no. 2007/0262001 A1, published in the name of Hansen et al. discloses a method for sorting paving stones and automating laying patterns of paving stones.

U.S. Patent Application no. 2007/0266649 A1, published in the name of Overmyer et al. discloses a special cement-like coated mobile building and process to manufacture.

U.S. Patent Application no. 2007/0286688 A1, published in the name of Bradley discloses modular steel panels for constructing retaining walls.

U.S. Pat. No. 7,140,364 B1, issued in the name of Buffington discloses a prefabricated modular, lightweight fireplace for residential or small business installation.

U.S. Pat. No. 4,972,537, issued in the name of Slaw, Sr. discloses orthogonally composite prefabricated structural members used as slabs and the method of fabricating and fastening these members to other parts of the structure.

U.S. Pat. No. 7,137,800 B1, issued in the name of Longo discloses methods and apparatus for casting elongated prestressed concrete structures, e.g., utility poles of octagonal cross-section.

Consequently, a need has been felt for modular ornamental structures and methods for constructing the same. This application presents claims and embodiments that fulfill a need or needs not yet satisfied by the products, inventions and methods previously or presently available. In particular, the claims and embodiments disclosed herein describe a plurality of framework supporting decorative panels, the framework interconnected collectively so as to form a modular ornamental structure, the modular ornamental structure providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Therefore, it is an object of the present invention to provide a modular ornamental structure comprised of a plurality of framework.

It is another object of the present invention to provide a plurality of framework adapted to support decorative panels.

It is another object of the present invention to provide a plurality of framework interconnected collectively so as to form a modular ornamental structure.

It is another object of the present invention to provide decorative panels each comprising a decorative substrate.

It is another object of the present invention to provide a decorative substrate formed of a concrete mixture.

It is another object of the present invention to provide a plurality of framework mounted with a plurality of corner posts.

It is another object of the present invention to provide a modular structure in the form of a planter.

It is another object of the present invention to provide a modular structure in the form of a grill.

It is still another object of the present invention to provide a modular structure in the form of a well.

It is yet another object of the present invention to provide a method for constructing a modular ornamental structure.

In accordance with one embodiment of the present invention, a modular ornamental structure is disclosed comprising a framework defined as a closed plane having a framework void, the framework comprising at least one panel, the panel comprising opposed side rails having ends securably mounted to ends of end rails. Each of the side rails and end rails has an inside wall with one longitudinally extending edge securably mounted to a coextensive edge of a first end wall. The inside wall further has an opposite longitudinally extending edge securably mounted to a coextensive edge of a second end wall. The inside wall, first end wall, and second end wall are mounted so as to collectively form a substrate receiving channel. The framework may be manufactured in various closed plane figures or polygonal shapes. A plurality of framework may be interconnected collectively so as to form a modular ornamental structure.

In accordance with another embodiment, the framework is defined as a closed plane having a framework void, the framework comprises end rails each having an inside wall. Each inside wall has a front side opposing a rear side and includes an upper edge and a lower edge. Each inside wall further includes opposing longitudinally extending edges to which vertical side walls are integrally joined respectively. Upper and lower ends of the vertical side walls are coped so as to form an L-shaped recess. The inside wall and vertical side walls collectively form a substrate receiving channel.

In further accordance with this embodiment, the framework comprises opposed side rails each having an inside wall, the inside wall having a front side opposing a rear side and having opposing longitudinally extending edges to which vertical side walls are integrally joined respectively. The inside wall and vertical side walls collectively form a substrate receiving channel.

The end rails and opposed side rails are positioned flat on a flat, horizontal support surface.

An end of a first side rail is aligned in the upper L-shaped recess of a first end rail so as to mate flush therewith. The first end rail is tack welded to the end of the first side rail at their engaged alignment, thereby forming a first upper interface. An opposite end of first side rail is aligned in the upper L-shaped recess of a second end rail so as to mate flush therewith. The second end rail is tack welded to the opposite end of the first side rail at their engaged alignment, thereby forming a second upper interface. An end of second side rail is aligned in the lower L-shaped recess of the first end rail so as to mate flush therewith. The first end rail is tack welded to the end of the second side rail at their engaged alignment, thereby forming a first lower interface. An opposite end of second side rail is aligned in the lower L-shaped recess of second end rail so as to mate flush therewith. The second end rail is tack welded to the opposite end of second side rail at their engaged alignment, thereby forming a second lower interface.

A first and second substrate reinforcement member are provided in order to enhance the structural integrity of a decorative substrate. The decorative substrate is formed by pouring a concrete mixture into the framework void of each framework. The concrete mixture is then tamped and vibrated. After tamping and vibrating the concrete mixture, the freshly poured concrete mixture is stricken with a leveling device. The concrete mixture is then floated and smoothed, and thereafter, edged and troweled. A color hard colorant is applied and floated into the concrete mixture surface. After sufficiently covering the concrete mixture surface with the color hard colorant, the concrete mixture surface is troweled to a smooth, even finish.

During an initial concrete set phase and at a time during which the concrete mixture is of a consistency able to support an impression mat and a weighted mass, a release agent is applied to an impression side of the impression mat just prior to placement of the impression side of impression mat atop the concrete mixture surface. The impression side is next positioned atop the concrete mixture surface. Thereafter, the mat is walked on and tamped in order to transfer the detail imprint of the impression side of mat to the surface of concrete mixture. The mat is subsequently removed revealing the ornamental panel. The panel undergoes an initial cure phase. After the expiration of the initial cure phase, a color wash solution is applied to the concrete mixture surface of panel in order to develop and form an antiqued surface. Finally, a liquid sealer is applied to the antiqued surface in order to provide protection against the elements.

A plurality of corner posts is provided and defined of an elongated, tubular configuration. The plurality of corner posts is constructed of metal, preferably carbon steel. The plurality of corner posts each includes a top opposing a bottom, the bottom having an end plate welded thereto. One of the plurality of corner posts is aligned, centered against, and mounted to the rear side of the inside wall of the first end rail of one of the plurality of framework. A second corner post of the plurality of corner post is aligned, centered against, and mounted to the rear side of the inside wall of the second end rail of the one of the plurality of framework. A third corner post of the plurality of corner posts is aligned, centered against, and mounted to the rear side of the inside wall of the first end rail of a second framework of the plurality of framework. A fourth corner post of the plurality of corner posts is aligned and centered against the rear side of the inside wall of the second end rail of the second framework of the plurality of framework. A plurality of framework are mounted to the first and second framework so as to provide a closed plane structure described herein as a modular apparatus.

The modular apparatus comprises additional components constructed and mounted thereto in order to provide a specifically desired modular ornamental structure including but not limited to a serving bar, a planter, a well, a grill, a support column for a mailbox, a fence, railing, or gate. These additional components comprise: 1) a railing tack welded atop each first side rail and to each respective corner post, a first floor support strip tack welded longitudinally to an upper ledge of a vertical side wall of a second side rail, and a second floor support strip tack welded longitudinally to an upper ledge of a vertical side wall of an opposing second side rail, and a floor comprised of treated lumber laid atop the first and second floor support strips, thereby providing a planter; 2) a roof suitably mounted atop the plurality of corner post of the modular apparatus, thereby providing a well; and 3) a door, the door is hingedly mounted to a vertical sidewall of the second end rail of a framework of the plurality of framework, the framework void of at least one of the framework is occupied by the door rather than the decorative substrate, a cooking grid disposed atop the modular apparatus, a cover hingedly mounted to the second corner post and the third corner post, the cover comprising a plurality of exhaust outlets from which exhaust tubes integrally extend, thereby forming a grill.

The use of the present invention allows a plurality of framework which support decorative panels to be interconnected collectively so as to form a modular ornamental structure in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
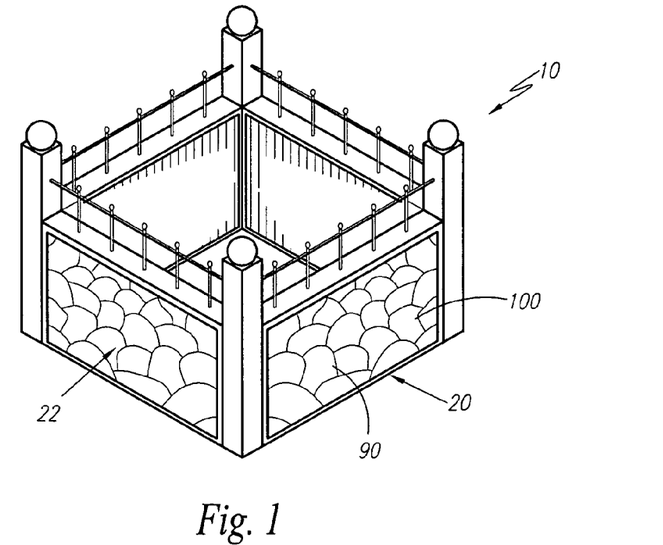
FIG. 1 is a perspective view of a modular ornamental structure, according to the preferred embodiment of the present invention.
Figure 2:
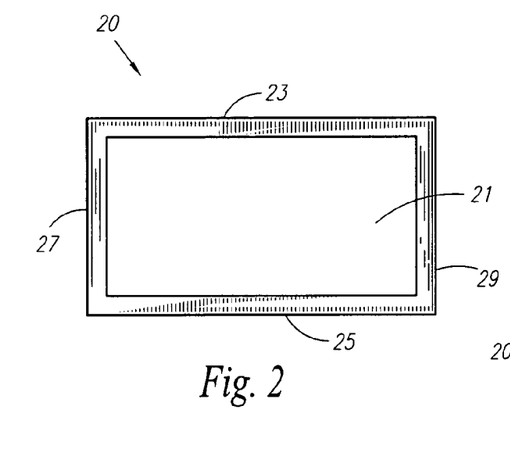
FIG. 2 is a top plan view of a framework illustrating the framework void, according to one embodiment of the present invention.
Figure 3:
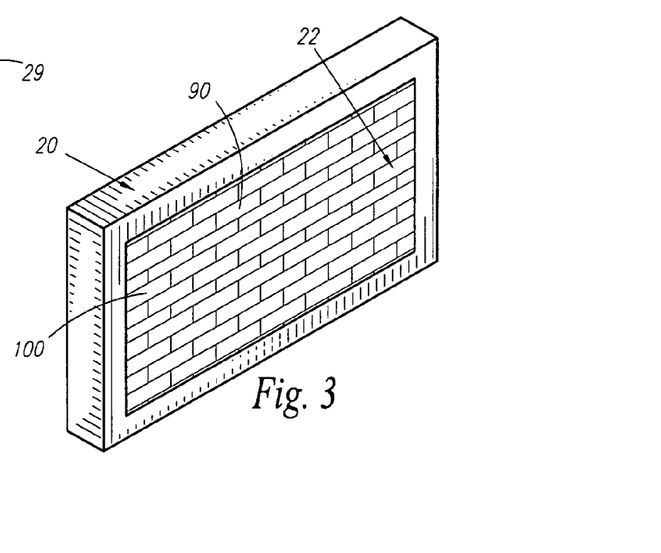
FIG. 3 is aside elevational view of a framework shown supporting a panel, according to one embodiment of the present invention.
Figure 4:
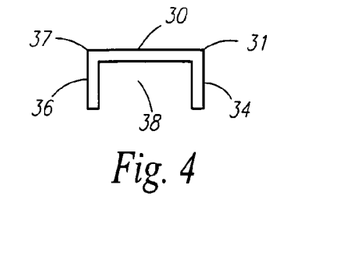
FIG. 4 is an end view of each the opposed side rails and end rails, according to one embodiment of the present invention.

With reference to FIG. 1, a modular ornamental structure 10 comprising at least one modular, ornamental panel is disclosed and generally denoted by the reference character 22. Referring now to FIG. 1 through FIG. 4, one embodiment disclosed describes a framework 20 defined as a closed plane having a framework void 21, the framework 20 is adapted for supporting at least one panel 22, the framework 20 comprising opposed side rails 23, 25 having ends securably mounted, such as by arc welding, to ends of end rails 27, 29. Each of the side rails 23, 25 and end rails 27, 29 has an inside wall 30 with one longitudinally extending edge securably mounted at 31 to a coextensive edge of a first end wall 34 such that the inside wall 30 and first end wall 34 are generally oriented perpendicular to one another. The inside wall 30 further has an opposite longitudinally extending edge securably mounted at 37 to a coextensive edge of a second end wall 36 such that the inside wall 30 and second end wall 36 are generally oriented perpendicular to one another. The inside wall 30, first end wall 34, and second end wall 36 are mounted so as to collectively form a substrate receiving channel 38, to be described later in greater detail. The framework 20 may be manufactured in various closed plane figures or polygonal shapes, including but not limited to circular, parallelogram, rectangular, square, triangular, pentagonal, hexagonal, heptagonal, octagonal, trapezoidal and the like. FIG. 3 illustrates the framework 20 shown manufactured in a generally rectangular shape. The framework 20 is preferably constructed of a metal alloy.

Figure 5A:
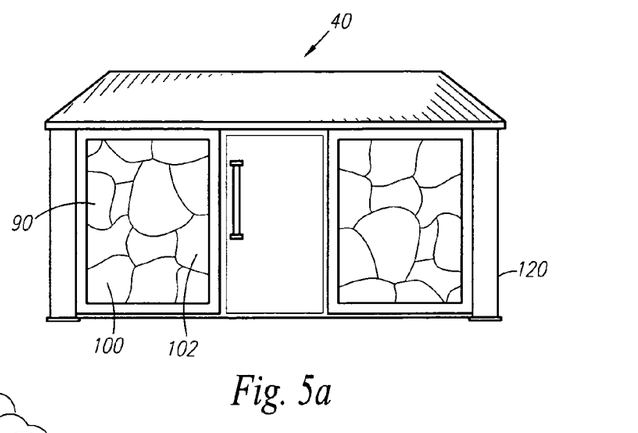
FIGS. 5A-5F illustrate various modular ornamental structures.
Figure 5B:
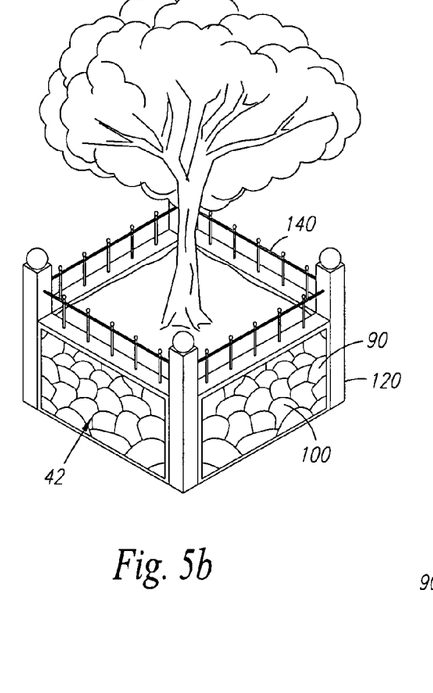

Referring now to FIG. 5A through FIG. 5F, a plurality of framework 20 may be interconnected collectively so as to form a modular ornamental structure 10 such as a serving bar 40, a planter 42, a well 44, a grill 46, a support column 48 for a mailbox 48a, and a fence 49, railing, or gate. The plurality of framework 20 are securably interconnected via a suitable mounting method or means, such as arc welding. The plurality of framework 20 are interconnected to form any desired number of configurations, including but not limited to square, rectangular, pentagonal, and the like. FIG. 6 illustrates a plurality of framework 20 interconnected to form a generally rectangular configuration. The plurality of framework 20 may be welded to one another along a vertical side edge of each in a manner which interconnects the plurality of framework 20 and forms a closed plane structure.

Referring now to FIG. 7 through FIG. 10, in accordance to another embodiment, the framework 20a is defined as a closed plane having a framework void 21a, the framework 20a comprises end rails 27a, 29a each having an inside wall 30a. Each inside wall 30a has a front side 50 opposing a rear side 52 and includes an upper edge 33 and a lower edge 39. Each inside wall 30a further includes opposing longitudinally extending edges to which vertical side walls 34a are integrally joined respectively. The vertical side walls 34a each extend generally perpendicularly from the respective opposing longitudinally extending edges of inside wall 30a. Upper and lower ends of the vertical side walls 34a are coped so as to form an L-shaped recess 28. The inside wall 30a and vertical side walls 34a collectively form a substrate receiving channel 38a.

In further accordance with this embodiment, the framework 20a comprises opposed side rails 23a, 25a each having an inside wall 30b, the inside wall 30b having a front side 54 opposing a rear side 56 and having opposing longitudinally extending edges to which vertical side walls 35 are integrally joined respectively. The vertical side walls 35 each extend generally perpendicularly from the respective opposing longitudinally extending edges of inside wall 30b. The inside wall 30b and vertical side walls 35 collectively form a substrate receiving channel 38a. Burrs, slag, or other unwanted debris is suitably removed from the end rails 27a, 29a and opposed side rails 23a, 25a.

Figure 11:
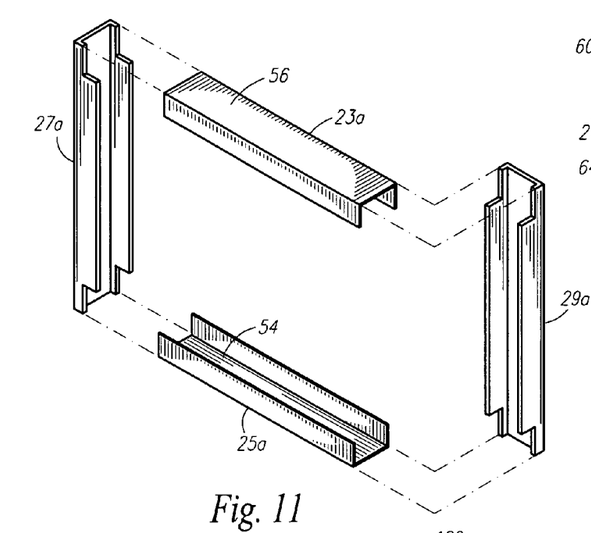
FIG. 11 is an exploded perspective view illustrating permanent attachment of side rails to end rails.
Figure 12:
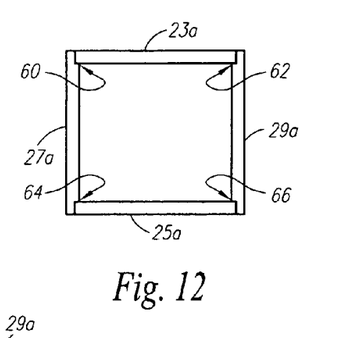
FIG. 12 is a front side elevational view of a framework illustrating the upper and lower interfaces thereof, according to the preferred embodiment of the present invention.

Next, with respect to FIG. 11 through FIG. 12, the end rails 27a, 29a and opposed side rails 23a, 25a are positioned flat on a flat, horizontal support surface (not shown). The end rails 27a, 29a are positioned longitudinally and generally parallel in a manner such that the upper L-shaped recess 28 of end rail 27a faces the upper L-shaped recess 28 of end rail 29a, and the lower L-shaped recess 28 of end rail 27a faces the lower L-shaped recess 28 of end rail 29a. The opposed side rails 23a, 25a are positioned between the end rails 27a, 29a, generally horizontal and parallel. Side rail 23a is positioned above side rail 25a, and is further positioned such that the rear side 56 of the inside wall 30b thereof is oriented upward. Side rail 25a is positioned below side rail 23a, and is further positioned such that the front side 54 of the inside wall 30b thereof is oriented upward.

An end of side rail 23a is aligned in the upper L-shaped recess 28 of end rail 27a so as to mate flush therewith. The end rail 27a is tack welded to the end of side rail 23a at their engaged alignment, thereby forming a first upper interface 60. An opposite end of side rail 23a is aligned in the upper L-shaped recess of end rail 29a so as to mate flush therewith. The end rail 29a is tack welded to the opposite end of side rail 23a at their engaged alignment, thereby forming a second upper interface 62. An end of side rail 25a is aligned in the lower L-shaped recess 28 of end rail 27a so as to mate flush therewith. The end rail 27a is tack welded to the end of side rail 25a at their engaged alignment, thereby forming a first lower interface 64. An opposite end of side rail 25a is aligned in the lower L-shaped recess 28 of end rail 29a so as to mate flush therewith. The end rail 29a is tack welded to the opposite end of side rail 25a at their engaged alignment, thereby forming a second lower interface 66.

Figure 13:
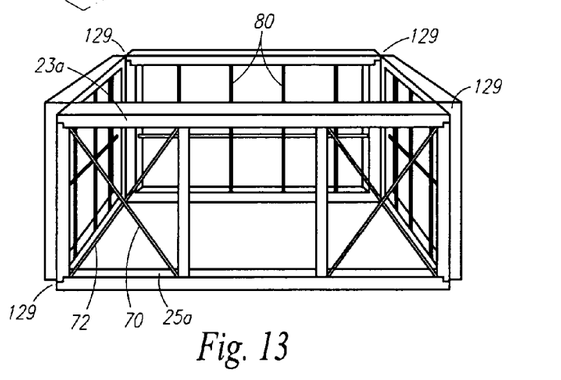
FIG. 13 is a perspective view of a first and second substrate reinforcement member shown mounted to a framework of a plurality of interconnected framework.

Referring now more specifically to FIG. 13, in order to enhance the structural integrity of a decorative substrate 90 (to be described later in greater detail), a first and second substrate reinforcement member 70, 72 is provided. The first substrate reinforcement member 70 defines an elongated, flat configuration having an upper end opposing a lower end. The first substrate reinforcement member 70 is constructed of metal, preferably carbon steel. The upper end of first substrate reinforcement member 70 is positioned at the first upper interface 60 against a proximal inner wall of one of the vertical sidewalls 35 of side rail 23a, and the lower end of member 70 is positioned at the second lower interface 66 against a corresponding proximal inner wall of one of the vertical sidewalls 35 of side rail 25a. The upper end of first substrate reinforcement member 70 is tack welded to the proximal inner wall of one of the vertical sidewalls 35 of side rail 23a, and the lower end of first substrate reinforcement member 70 is tack welded to the corresponding proximal inner wall of one of the vertical sidewalls 35 of side rail 25a.

The second substrate reinforcement member 72 defines an elongated, flat configuration having an upper end opposing a lower end. The second substrate reinforcement member 72 is constructed of metal, preferably carbon steel. The upper end of second substrate reinforcement member 72 is positioned at the second upper interface 62 against a distal inner wall of one of the vertical sidewalls 35 of side rail 23a, and the lower end of member 72 is positioned at the first lower interface 64 against a corresponding distal inner wall of one of the vertical sidewalls 35 of side rail 25a. The upper end of second substrate reinforcement member 72 is tack welded to the distal inner wall of one of the vertical sidewalls 35 of side rail 23a, and the lower end of second substrate reinforcement member 72 is tack welded to the corresponding distal inner wall of one of the vertical sidewalls 35 of side rail 25a. The second substrate reinforcement member 72 is mounted so as to traverse the first substrate reinforcement member 70.

A plurality of substrate reinforcement members 80 may also be mounted vertically between opposed side rails 23a, 25a in a spaced orientation, also shown in FIG. 13. Each of the plurality of substrate reinforcement members 80 are tack welded at ends thereof to the front side 54 of the inside wall 30b of each of the opposed side rails 23a, 25a.

All exterior welds of the framework 20a are ground so as to be flush with the external surface of the end rails 27a, 29a and opposed side rails 23a, 25a. The framework 20a is coated with an epoxy primer.

A number of the framework 20a, as described according to the instant embodiment, may be constructed according to the method described hereinabove and interconnected collectively (in a manner to be described later in greater detail) in a desired configuration in order to form a desired modular ornamental structure 10.

Referring now to FIGS. 1, 3, 5A-5F, and 14-15, the decorative substrate 90 comprises a concrete mixture 100, a color hard colorant, a color wash solution, and a liquid sealer. The decorative substrate 90s constructed according to the method described hereinbelow. The framework 20, 20a or plurality of framework 20, 20a is positioned flat on a flat, horizontal support surface (not shown). For purposes of this disclosure, only one framework 20, 20a will be hereinafter described for purposes of clarity and brevity, however, it is to be understood that the method for constructing the decorative substrate 90 is equally applicable to a plurality of framework 20, 20a.

A bond breaker release agent is applied to the external surface of the framework 20, 20a. While the freshly applied bond breaker release agent is still wet, a concrete mixture 100 is poured into the framework void 21, 21a of each framework 20, 20a. The concrete mixture 100 is poured to a depth being approximately level with an upper surface of framework 20, 20a. In order to ensure concrete mixture 100 consolidation, the mixture 100 is tamped and vibrated. After tamping and vibrating the concrete mixture 100, the freshly poured concrete mixture 100 is stricken with a leveling device (not shown), such as a screed (not shown). The concrete mixture 100 is then floated to remove water which has risen to the upper surface thereof, thereby smoothing the concrete mixture 100. Next, the concrete mixture 100 is edged and troweled to provide the concrete mixture 100 with a smooth, even upper surface. A color hard colorant is applied using a dry shake method and floated into the concrete mixture 100 upper surface. The step of applying the color hard colorant using the dry shake method is repeated until the concrete mixture 100 upper surface is sufficiently covered by the color hard colorant. After sufficiently covering the concrete mixture 100 upper surface with the color hard colorant, the concrete mixture 100 upper surface is troweled to a smooth, even finish.

Figure 14:
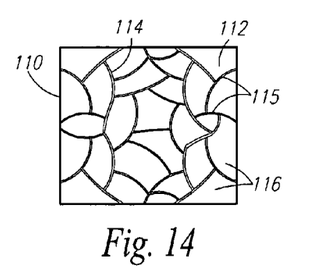
FIG. 14 is a top plan view of an impression mat illustrating the impression side thereof, according to the preferred embodiment of the present invention.
Figure 15:
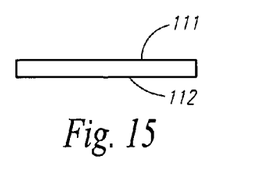
FIG. 15 is a side elevational view of the impression mat shown in FIG. 14.

During an initial concrete set phase and at a time during which the concrete mixture 100 is of a consistency able to support an impression mat 110 and a weighted mass, such as a person, supported there atop, a release agent is applied, such as by spraying, to an impression side 112 of the impression mat 110 just prior to placement of the impression side 112 of impression mat 110 atop the concrete mixture 100 surface. After applying the release agent to the impression side 112 of impression mat 110, the impression side 112 is positioned atop the concrete mixture 100 surface. The impression mat 110 is generally planar and has a size, shape, and configuration substantially approximating the size, shape, and configuration of the framework void 21, 21a. The impression mat 110 includes a top side 111 opposing the impression side 112, wherein the impression side 112 defines a detail imprint 114 comprised of raised ridges 115 separated by open areas 116. The impression side 112 of the impression mat 110 is adapted to leave an imprint of the particular impressionable design provided thereon onto the concrete mixture 100 upper surface. Impressionable designs include but are not limited to brick impressions, stone impressions, and slate impressions. After placing the impression side 112 of impression mat 110 atop the concrete mixture 100 surface, the mat 110 is walked on and tamped in order to transfer the detail imprint of the impression side 112 of mat 110 to the upper surface of concrete mixture 100. Thereafter, the mat 110 is removed revealing the ornamental panel 22. The panel 22 undergoes an initial cure phase which includes maintaining panel 22 in an immobilized position for a period extending approximately two to three days. After the expiration of the initial cure phase, a color wash solution is applied to the concrete mixture 100 upper surface of panel 22 in order to develop and form an antiqued surface 102. Finally, a liquid sealer is applied to the antiqued surface 102 in order to provide protection against the elements.

Figure 16:
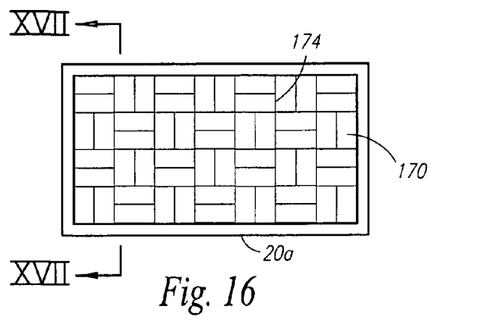
FIG. 16 is a side elevational view of a concrete plate shown rigidly attached and snugly residing within a framework, according to one embodiment of the present invention.
Figure 17:
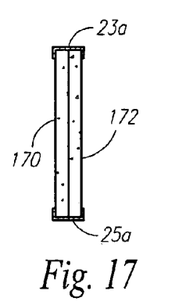
FIG. 17 is a cross-sectional view of the concrete plate taken along lines XVII-XVII of FIG. 16 illustrating the cementitious layer overlaid there atop.

Referring now to FIG. 16 and FIG. 17, in accordance to another embodiment, decorative substrate 90 may be constructed of a concrete plate 170 rigidly attached and snugly residing within the substrate receiving channel 38, 38a of opposed side rails 23, 23a, 25, 25a and end rails 27, 27a, 29, 29a of each framework 20, 20a, respectively. The concrete plate 170 is overlaid with a cementitious layer 172, the cementitious layer 172 having the impression side 112 of the impression mat 110 pressed thereagainst so as to leave a decorative imprint 174 or impressionable design formed therein. Decorative imprints 174 include but are not limited to brick imprints, stone imprints, and slate imprints.

Decorative substrate 90 may also be constructed of other rigid materials selected from the group consisting of fiberglass, plastic, resins, polymers, and composite materials.

In order to form a modular ornamental structure 10 such as a planter 42 or a grill 46, a plurality of framework 20a may be welded to one another along a vertical, outer side edge or end rail 27a, 29a of each framework 20a in a manner which interconnects the plurality of framework 20a and forms a closed plane structure as shown in FIG. 13. The closed plane structure shown in FIG. 13 has a rectangular configuration having corners each defining an L-shaped recess 129. Alternatively, the plurality of framework 20a are securably interconnected forming a modular apparatus 130 (shown in FIG. 18) or closed plane structure according to the method described hereinbelow.

Figures 18, 19:
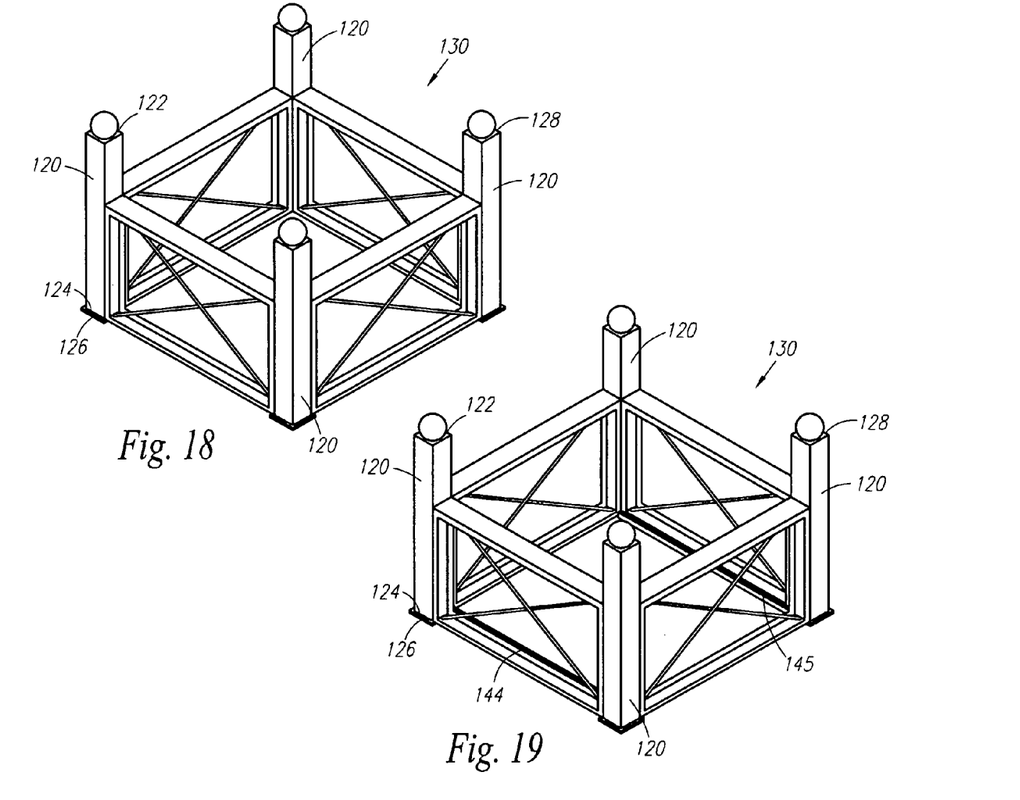
FIG. 18 is a perspective view of a modular apparatus, according to the preferred embodiment of the present invention.
FIG. 19 is a perspective view of the modular apparatus of FIG. 18 shown with first and second floor support strips mounted thereto.

Referring now to FIG. 5A through FIG. 5D, and more particularly to FIG. 18, a plurality of corner posts 120 is disclosed and defined of an elongated, tubular configuration. The plurality of corner posts 120 is constructed of metal, preferably carbon steel. The plurality of corner posts 120 each includes a top 122 opposing a bottom 124, the bottom 124 having an end plate 126 welded thereto. The end plate 126 is constructed of metal, preferably carbon steel. Each end plate 126 is cut to correspond to a same radius defining its corresponding corner post 120. The top 122 of each post 120 is mitered, folded, welded, and ground smooth along each external sidewall thereof in order to create a 45° sealed angular cap 128.

One of the plurality of corner posts 120 is aligned and centered against the rear side 52 of the inside wall 30a of end rail 27a of one of the plurality of framework 20a in a manner such that the end plate 126 of the one corner post 120 extends approximately two inches below the lower edge 39 of end rail 27a. The one corner post 120 is tack welded to the rear side 52 of the inside wall 30a of end rail 27a. A second corner post 120 of the plurality of corner post 120 is aligned and centered against the rear side 52 of the inside wall 30a of end rail 29a of the one of the plurality of framework 20a in a manner such that the end plate 126 of the second corner post 120 extends approximately two inches below the lower edge 39 of end rail 29a. The second corner post 120 is tack welded to the rear side 52 of the inside wall 30a of end rail 29a.

A third corner post 120 of the plurality of corner posts 120 is aligned and centered against the rear side 52 of the inside wall 30a of the end rail 27a of a second framework 20a of the plurality of framework 20a in a manner such that the end plate 126 of the third corner post 120 extends approximately two inches below the lower edge 39 of the end rail 27a. The third corner post 120 is tack welded to the rear side 52 of the inside wall 30a of the end rail 27a. A fourth corner post 120 of the plurality of corner posts 120 is aligned and centered against the rear side 52 of the inside wall 30a of the end rail 29a of the second framework 20a of the plurality of framework 20a in a manner such that the end plate 126 of the fourth corner post 120 extends approximately two inches below the lower edge 39 of the end rail 29a. The fourth corner post 120 is tack welded to the rear side 52 of the inside wall 30a of the end rail 29a.

The one framework 20a with attached corner posts 120 and the second framework 20a with attached corner posts 120 are placed in an upright position distally, in a vertical, parallel orientation atop a flat, horizontal support surface. The one framework 20a with attached corner posts 120 and the second framework 20a with attached corner posts 120 are suitably braced to prevent tilting.

A rear side 52 of an inside wall 30a of an end rail 27a of a third framework 20a of the plurality of framework 20a is aligned and centered against the one corner post 120 in a manner such that the end plate 126 of the one corner post 120 extends approximately two inches below a lower edge 39 of the end rail 27a of the third framework 20a. The rear side 52 of the inside wall 30a of the end rail 27a of the third framework 20a is tack welded to the one corner post 120.

A rear side 52 of an inside wall 30a of an end rail 27a of a fourth framework 20 of the plurality of framework 20a is aligned and centered against the second corner post 120 in a manner such that the end plate of the second corner post 120 extends approximately two inches below a lower edge 39 of the end rail 27a of the fourth framework 20a. The rear side 52 of the inside wall 30a of the end rail 27a of the fourth framework 20a is tack welded to the second corner post 120.

The second framework 20a of the plurality of framework 20a is drawn toward the one framework 20a such that the fourth corner post 20a of the second framework 20a engages the rear side 52 of the inside wall 30a of the end rail 29a of the third framework 20a, and the third corner post 20a of the second framework 20a engages the rear side 52 of the inside wall 30a of the end rail 29a of the fourth framework 20a. The second framework 20a is clamped to the one framework 20a. The fourth corner post 120 of the plurality of corner posts 120 is aligned and centered against the rear side 52 of the inside wall 30a of the end rail 29a of the third framework 20a of the plurality of framework 20a in a manner such that the end plate 126 of the fourth corner post 120 extends approximately two inches below the lower edge 39 of the end rail 29a of the third framework 20a. The fourth corner post 120 is tack welded to the rear side 52 of the inside wall 30a of the end rail 29a of the third framework 20a. The third corner post 120 of the plurality of corner posts 120 is aligned and centered against the rear side 52 of the inside wall 30a of the end rail 29a of the fourth framework 20a of the plurality of framework 20a in a manner such that the end plate 126 of the third corner post 120 extends approximately two inches below the lower edge 39 of the end rail 29a of the fourth framework 20a. The third corner post 120 is tack welded to the rear side 52 of the inside wall 30a of the end rail 29a of the fourth framework 20a. Any bracing and clamping means (not shown) utilized are removed.

Figure 20:
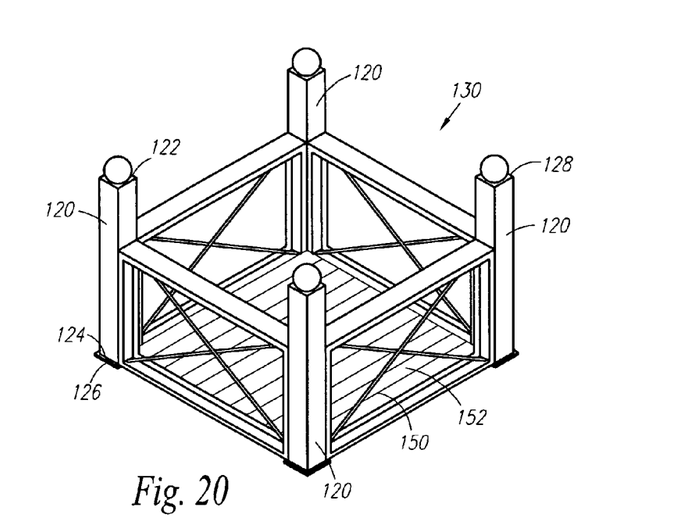
FIG. 20 is a perspective view of the modular apparatus of FIG. 19 shown with a floor resting atop the first and second floor support strips.

In further accordance to the instant embodiment concerning the modular apparatus 130, additional components may be constructed and installed thereon in order to provide a specifically desired modular ornamental structure 10. For example, in order to provide a planter 42, as shown in FIG. 5B, a decorative substrate 90 is housed within each framework 20a of the plurality of framework 20a; a railing 140 may be tack welded atop each side rail 23a and to each respective corner post 120; a first floor support strip 144 is tack welded longitudinally to an upper ledge of a vertical side wall 35 of a side rail 25a, and a second floor support strip 145 is tack welded longitudinally to an upper ledge of a vertical side wall 35 of an opposing side rail 25a; and a floor 150 comprised of treated lumber 152 laid atop the first and second floor support strips 144, 145 (shown in FIG. 19 and FIG. 20).

Figure 5C:
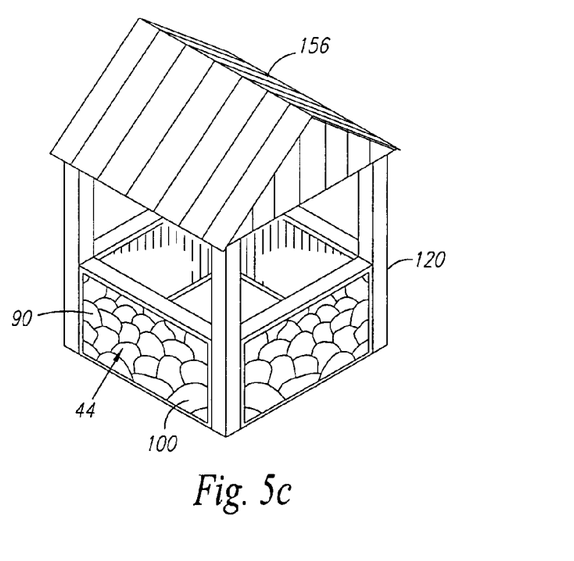
Figure 6:
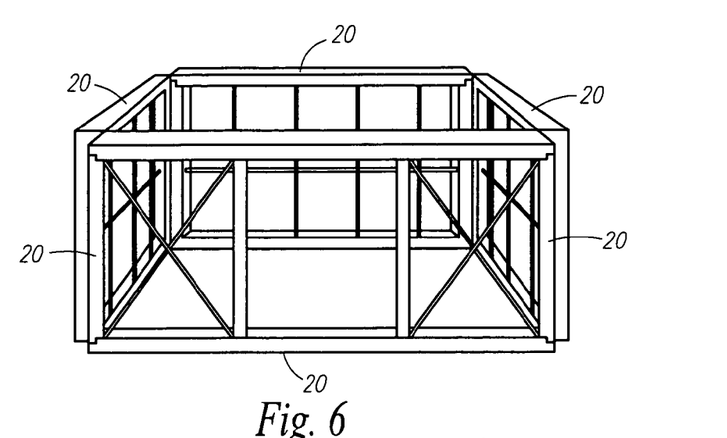
FIG. 6 is a perspective view of a plurality of framework interconnected to form a generally rectangular configuration.
Figure 7:
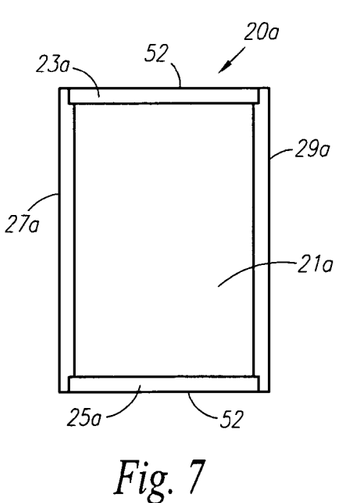
FIG. 7 is a front side elevational view of a framework, according to the preferred embodiment of the present invention.
Figure 8:
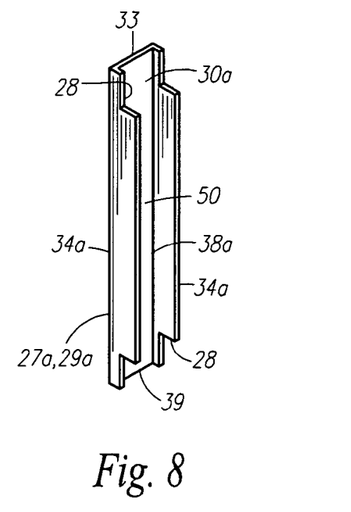
FIG. 8 is a front perspective view of an end rail, according to the preferred embodiment of the present invention.
Figure 9:
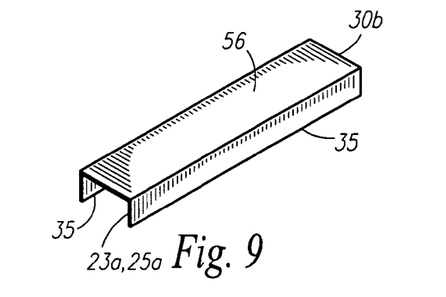
FIG. 9 is a rear perspective view of a side rail, according to the preferred embodiment of the present invention.
Figure 10:
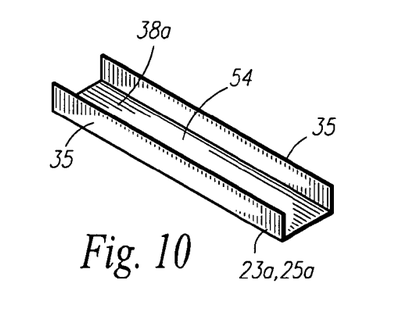
FIG. 10 is a top perspective view the side rail shown in FIG. 9, according to the preferred embodiment of the present invention.

Further, in order to provide a well 44, as shown in FIG. 5C, a roof 156 may be suitably mounted atop the plurality of corner post 120 of the modular apparatus 130, and a decorative substrate 90 is housed within each framework 20a of the plurality of framework 20a.

Figure 5D:
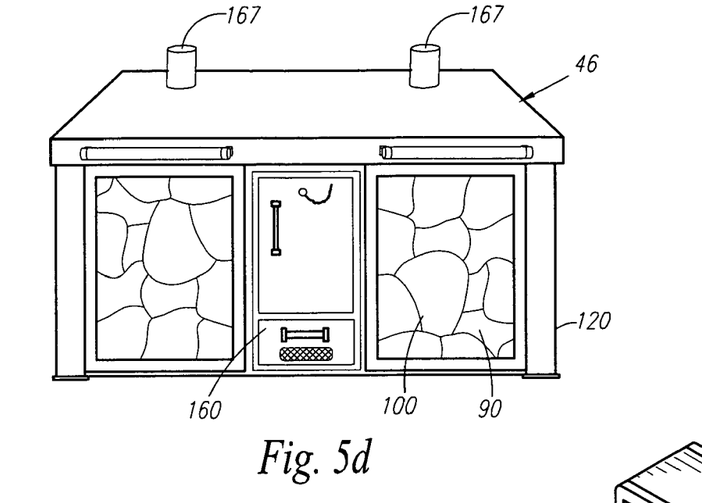
Figure 5E:
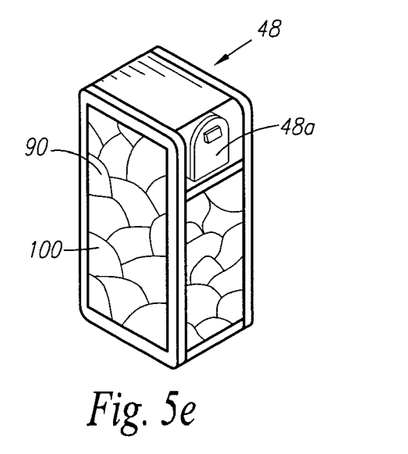
Figure 5F:
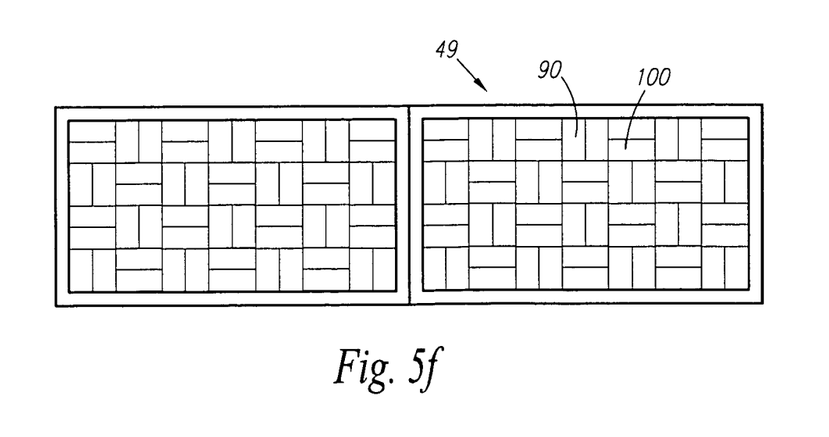
Figures 21, 22:
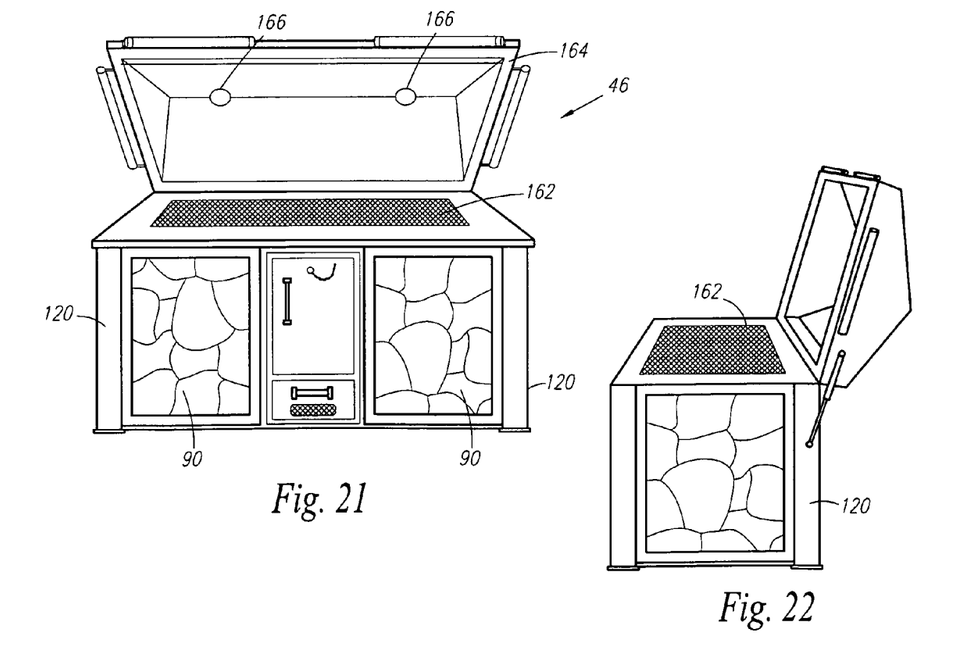
FIG. 21 is a front perspective view of the grill with the cover thereof shown in an open position.
FIG. 22 is a side perspective view of the grill of FIG. 21.

Moreover, as illustrated in FIG. 5D, FIG. 21, and FIG. 22, a grill 46 is formed which includes a door 160, the door 160 may be hingedly mounted to a vertical sidewall 34a of the end rail 29a of a framework 20a. In this particular embodiment, the framework void 21a of at least one framework 20a is occupied by the door 160 rather than the decorative substrate 90, and a decorative substrate 90 is housed within each remaining framework 20a of the plurality of framework 20a. This embodiment further comprises a cooking grid 162 disposed atop the modular apparatus 130, a cover 164 hingedly mounted to the second corner post 120 and the third corner post 120, the cover 164 comprising a plurality of exhaust outlets 166 from which exhaust tubes 167 integrally extend.

Finally, two coats of a urethane coating composition are applied to all metal surfaces of the modular ornamental structure 10.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A method for constructing at least one framework to form a modular ornamental structure, the method comprising the steps of:
   (a) placing a first end rail, a second end rail, a first side rail, and a second side rail flatly on a flat, horizontal support surface, the first end rail and the second end rail each having an inside wall, each inside wall has a front side opposing a rear side and includes an upper edge and a lower edge, each inside wall further includes opposing longitudinally extending edges to which vertical side walls are integrally joined respectively, the vertical side walls each extend generally perpendicularly from the respective opposing longitudinally extending edges of the inside wall, the vertical side walls each include an upper end and a lower end, the upper end and the lower end of the vertical side walls are coped so as to form an upper L-shaped recess and a lower L-shaped recess, each inside wall and the respective vertical side walls collectively form a substrate receiving channel, the first side rail and the second side rail each having an inside wall segment, each inside wall segment having a front side opposing a rear side and having opposing longitudinally extending edges to which vertical side walls are integrally joined respectively, the vertical side walls of the inside wall segment each extend generally perpendicularly from the respective opposing longitudinally extending edges of the inside wall segment, each inside wall segment and the respective vertical side walls thereof collectively form a substrate receiving channel;
   (b) positioning the first end rail and the second end rail longitudinally and parallel in a manner such that the upper L-shaped recess of the first end rail faces the upper L-shaped recess of the second end rail, and the lower L-shaped recess of the first end rail faces the lower L-shaped recess of the second end rail;
   (c) positioning the first side rail and the second side rail generally horizontal and parallel between the first end rail and the second end rail;
   (d) positioning the first side rail above the second side rail in a manner such that the rear side of the inside wall segment of the first side rail is oriented upward;
   (e) positioning the second side rail below the first side rail in a manner such that the front side of the inside wall segment of the second side rail is oriented upward;
   (f) aligning an end of the first side rail in the upper L-shaped recess of the first end rail in a manner such that the end of the first side rail mates flush with the upper L-shaped recess of the first end rail;
   (g) tack welding the first end rail to the end of the first side rail at an engaged mating alignment, thereby forming a first upper interface;

(h) aligning an opposite end of the first side rail in the upper L-shaped recess of the second end rail in a manner such that the opposite end of the first side rail mates flush with the upper L-shaped recess of the second end rail;

(i) tack welding the second end rail to the opposite end of the first side rail at an engaged mating alignment, thereby forming a second upper interface;

(j) aligning an end of the second side rail in the lower L-shaped recess of the first end rail in a manner such that the end of the second side rail mates flush with the lower L-shaped recess of the first end rail;

(k) tack welding the first end rail to the end of the second side rail at an engaged mating alignment, thereby forming a first lower interface;

(l) aligning an opposite end of the second side rail in the lower L-shaped recess of the second end rail in a manner such that the opposite end of the second side rail mates flush with the lower L-shaped recess of the second end rail;

(m) tack welding the second end rail to the opposite end of the second side rail at an engaged mating alignment, thereby forming a second lower interface;

(n) positioning an upper end of a first substrate reinforcement member at the first upper interface against a proximal inner wall of one of the vertical sidewalls of the first side rail;

(o) positioning a lower end of the first substrate reinforcement member at the second lower interface against a corresponding proximal inner wall of one of the vertical sidewalls of the second side rail;

(p) tack welding the upper end of the first substrate reinforcement member to the proximal inner wall of one of the vertical sidewalls of the first side rail;

(q) tack welding the lower end of the first substrate reinforcement member to the corresponding proximal inner wall of one of the vertical sidewalls of the second side rail;

(r) positioning an upper end of a second substrate reinforcement member at the second upper interface against a distal inner wall of one of the vertical sidewalls of the first side rail;

(s) positioning a lower end of the second substrate reinforcement member at the first lower interface against a corresponding distal inner wall of one of the vertical sidewalls of the second side rail;

(t) tack welding the upper end of the second substrate reinforcement member to the distal inner wall of one of the vertical sidewalls of the first side rail;

(u) tack welding the lower end of the second substrate reinforcement member to the corresponding distal inner wall of one of the vertical sidewalls of the second side rail in a manner so that the second substrate reinforcement member traverses the first substrate reinforcement member;

(v) grounding exterior welds of the one framework so that the exterior welds are flush with an external surface of the first end rail, the second end rail, the first side rail, and the second side rail, the one framework having a framework void; and (w) coating the one framework with an epoxy primer.

2. The method for constructing at least one framework to form a modular ornamental structure of claim 1 further comprising the steps of:

(a) repeating steps (a)-(u) so as to form a second framework, the second framework having a framework void;

(b) grounding exterior welds of the second framework so that the exterior welds are flush with an external surface of the first end rail, the second end rail, the first side rail, and the second side rail of the second framework;

(c) coating the second framework with an epoxy primer;

(d) repeating steps (a)-(u) so as to form a third framework, the third framework having a framework void;

(e) grounding exterior welds of the third framework so that the exterior welds are flush with an external surface of the first end rail, the second end rail, the first side rail, and the second side rail of the third framework;

(f) coating the third framework with an epoxy primer;

(g) repeating steps (a)-(u) so as to form a fourth framework, the fourth framework having a framework void;

(h) grounding exterior welds of the fourth framework so that the exterior welds are flush with an external surface of the first end rail, the second end rail, the first side rail, and the second side rail of the fourth framework; and (i) coating the fourth framework with an epoxy primer.

3. The method for constructing at least one framework to form a modular ornamental structure of claim 2 further comprising the steps of:

(a) positioning the one framework, the second framework, the third framework, and the fourth framework flatly on a flat, horizontal support surface;

(b) applying a bond breaker release agent to an external surface of each the one framework, the second framework, the third framework, and the fourth framework;

(c) pouring a concrete mixture into the framework void of each the one framework, the second framework, the third framework, and the fourth framework to a depth being approximately level with an upper surface of each the one framework, the second framework, the third framework, and the fourth framework;

(d) tamping and vibrating the concrete mixture in order to ensure the concrete mixture is consolidated;

(e) leveling the concrete mixture;

(f) floating the concrete mixture to remove water from an upper surface thereof;

(g) edging and troweling the concrete mixture;

(h) applying a color hard colorant to the upper surface of the concrete mixture using a dry shake method;

(i) repeating step (h) until the upper surface of the concrete mixture is sufficiently covered by the color hard colorant;

(j) troweling the upper surface of the concrete mixture to a smooth, even finish;

(k) applying a release agent to an impression side of an impression mat during an initial set phase of the concrete mixture;

(l) positioning the impression side of the impression mat atop the upper surface of the concrete mixture;

(m) walking on and tamping the impression mat in order to transfer a detail imprint provided by the impression side of the impression mat to the upper surface of the concrete mixture so as to create an ornamental panel;

(n) removing the impression mat so as to reveal the ornamental panel;

(o) maintaining the ornamental panel in an immobilized position for a period extending approximately two to three days;

(p) applying a color wash solution to an upper surface of the ornamental panel in order to develop and form an antiqued surface; and (q) applying a liquid sealer to the antiqued surface.

4. The method for constructing at least one framework to form a modular ornamental structure of claim 3 further comprising the steps of:

(a) aligning and centering a first corner post against the rear side of the inside wall of the first end rail of the one framework in a manner such that an end plate of the first corner post extends approximately two inches below the lower edge of the first end rail of the one framework;
(b) tack welding the first corner post to the rear side of the inside wall of the first end rail of the one framework;
(c) aligning and centering a second corner post against the rear side of the inside wall of second end rail of the one framework in a manner such that an end plate of the second corner post extends approximately two inches below the lower edge of the second end rail of the one framework;
(d) tack welding the second corner post to the rear side of the inside wall of the second end rail of the one framework;
(e) aligning and centering a third corner post against the rear side of the inside wall of the first end rail of the second framework in a manner such that an end plate of the third corner post extends approximately two inches below the lower edge of the first end rail of the second framework;
(f) tack welding the third corner post to the rear side of the inside wall of the first end rail of the second framework;
(g) aligning and centering a fourth corner post against the rear side of the inside wall of the second end rail of the second framework in a manner such that an end plate of the fourth corner post extends approximately two inches below the lower edge of the second end rail of the second framework;
(h) tack welding the fourth corner post to the rear side of the inside wall of the second end rail of the second framework;
(i) placing both the first framework with attached first corner post and second corner post and the second framework with attached third corner post and fourth corner post in an upright position distally, in a vertical, parallel orientation atop a flat, horizontal support surface;
(j) bracing the one framework with attached first corner post and second corner post and the second framework with attached third corner post and fourth corner post to prevent tilting thereof;
(k) aligning and centering the rear side of the inside wall of the first end rail of the third framework against the first corner post in a manner such that the end plate of the first corner post extends approximately two inches below the lower edge of the first end rail of the third framework;
(l) tack welding the rear side of the inside wall of the first end rail of the third framework to the first corner post;
(m) aligning and centering the rear side of the inside wall of the first end rail of the fourth framework against the second corner post in a manner such that the end plate of the second corner post extends approximately two inches below the lower edge of the first end rail of the fourth framework;
(n) tack welding the rear side of the inside wall of the first end rail of the fourth framework to the second corner post;
(o) drawing the second framework toward the one framework such that the fourth corner post of the second framework engages the rear side of the inside wall of the second end rail of the third framework, and the third corner post of the second framework engages the rear side of the inside wall of the second end rail of the fourth framework;
(p) clamping the second framework to the first framework;
(q) aligning and centering the fourth corner post against the rear side of the inside wall of the second end rail of the third framework in a manner such that the end plate of the fourth corner post extends approximately two inches below the lower edge of the second end rail of the third framework;
(r) tack welding the fourth corner post to the rear-side of the inside wall of the second end rail of the third framework;
(s) aligning and centering the third corner post against the rear side of the inside wall of the second end rail of the fourth framework in a manner such that the end plate of the third corner post extends approximately two inches below the lower edge of the second end rail of the fourth framework;
(t) tack welding the third corner post to the rear side of the inside wall of the second end rail of the fourth framework; and
(u) removing a clamping means used to clamp the second framework to the one framework.

5. The method for constructing at least one framework to form a modular ornamental structure of claim 4, wherein the first corner post, the second corner post, the third corner post, and the fourth corner post each includes a top opposing a bottom, the bottom having an end plate welded thereto, the end plate is cut to correspond to a same radius defining the end plate's corresponding corner post, the top of each the first corner post, the second corner post, the third corner post, and the fourth corner post is mitered, folded, welded, and ground smooth along each external sidewall thereof in order to create a 45° sealed angular cap.

6. The method for constructing at least one framework to form a modular ornamental structure of claim 4 further comprising the steps of:
(a) tack welding a railing atop the rear side of the first side rail of each the one framework, the second framework, the third framework, the fourth framework, and to each respective the first corner post, the second corner post, the third corner post, and the fourth corner post;
(b) tack welding a first floor support strip longitudinally to an upper ledge of the vertical side wall of a desired second side rail;
(c) tack welding a second floor support strip longitudinally to an upper ledge of the vertical side wall of a second side rail opposing the desired second side rail;
(d) laying a floor atop the first floor support strip and the second floor support strip; and
(e) applying two coats of a urethane coating composition to the one framework, the second framework, the third framework, the fourth framework, the first corner post, the second corner post, the third corner post, the fourth corner post, the first floor support strip, the second floor support strip, and the railing.

7. The method for constructing at least one framework to form a modular ornamental structure of claim 4 further comprising the steps of:
(a) mounting a roof to the top of each the first corner post, the second corner post, the third corner post, and the fourth corner post; and
(b) applying two coats of a urethane coating composition to the one framework, the second framework, the third framework, the fourth framework, the first corner post, the second corner post, the third corner post, and the fourth corner post.

8. A method for constructing at least one framework to form a modular ornamental structure, the method comprising the steps of:

(a) placing a first end rail, a second end rail, a first side rail, and a second side rail flatly on a flat, horizontal support surface, the first end rail and the second end rail each having an inside wall, each inside wall has a front side opposing a rear side and includes an upper edge and a lower edge, each inside wall further includes opposing longitudinally extending edges to which vertical side walls are integrally joined respectively, the vertical side walls each extend generally perpendicularly from the respective opposing longitudinally extending edges of the inside wall, the vertical side walls each include an upper end and a lower end, the upper end and the lower end of the vertical side walls are coped so as to form an upper L-shaped recess and a lower L-shaped recess, each inside wall and the respective vertical side walls collectively form a substrate receiving channel, the first side rail and the second side rail each having an inside wall segment, each inside wall segment having a front side opposing a rear side and having opposing longitudinally extending edges to which vertical side walls are integrally joined respectively, the vertical side walls of the inside wall segment each extend generally perpendicularly from the respective opposing longitudinally extending edges of the inside wall segment, each inside wall segment and the respective vertical side walls thereof collectively form a substrate receiving channel;

(b) positioning the first end rail and the second end rail longitudinally and parallel in a manner such that the upper L-shaped recess of the first end rail faces the upper L-shaped recess of the second end rail, and the lower L-shaped recess of the first end rail faces the lower L-shaped recess of the second end rail;

(c) positioning the first side rail and the second side rail generally horizontal and parallel between the first end rail and the second end rail;

(d) positioning the first side rail above the second side rail in a manner such that the rear side of the inside wall segment of the first side rail is oriented upward;

(e) positioning the second side rail below the first side rail in a manner such that the front side of the inside wall segment of the second side rail is oriented upward;

(f) aligning an end of the first side rail in the upper L-shaped recess of the first end rail in a manner such that the end of the first side rail mates flush with the upper L-shaped recess of the first end rail;

(g) tack welding the first end rail to the end of the first side rail at an engaged mating alignment, thereby forming a first upper interface;

(h) aligning an opposite end of the first side rail in the upper L-shaped recess of the second end rail in a manner such that the opposite end of the first side rail mates flush with the upper L-shaped recess of the second end rail;

(i) tack welding the second end rail to the opposite end of the first side rail at an engaged mating alignment, thereby forming a second upper interface;

(j) aligning an end of the second side rail in the lower L-shaped recess of the first end rail in a manner such that the end of the second side rail mates flush with the lower L-shaped recess of the first end rail;

(k) tack welding the first end rail to the end of the second side rail at an engaged mating alignment, thereby forming a first lower interface;

(l) aligning an opposite end of the second side rail in the lower L-shaped recess of the second end rail in a manner such that the opposite end of the second side rail mates flush with the lower L-shaped recess of the second end rail;

(m) tack welding the second end rail to the opposite end of the second side rail at an engaged mating alignment, thereby forming a second lower interface;

(n) positioning an upper end of a first substrate reinforcement member at the first upper interface against a proximal inner wall of one of the vertical sidewalls of the first side rail;

(o) positioning a lower end of the first substrate reinforcement member at the second lower interface against a corresponding proximal inner wall of one of the vertical sidewalls of the second side rail;

(p) tack welding the upper end of the first substrate reinforcement member to the proximal inner wall of one of the vertical sidewalls of the first side rail;

(q) tack welding the lower end of the first substrate reinforcement member to the corresponding proximal inner wall of one of the vertical sidewalls of the second side rail;

(r) positioning an upper end of a second substrate reinforcement member at the second upper interface against a distal inner wall of one of the vertical sidewalls of the first side rail;

(s) positioning a lower end of the second substrate reinforcement member at the first lower interface against a corresponding distal inner wall of one of the vertical sidewalls of the second side rail;

(t) tack welding the upper end of the second substrate reinforcement member to the distal inner wall of one of the vertical sidewalls of the first side rail;

(u) tack welding the lower end of the second substrate reinforcement member to the corresponding distal inner wall of one of the vertical sidewalls of the second side rail in a manner so that the second substrate reinforcement member traverses the first substrate reinforcement member;

(v) grounding exterior welds of the one framework so that the exterior welds are flush with an external surface of the first end rail, the second end rail, the first side rail, and the second side rail, the one framework having a framework void and (w) coating the one framework with an epoxy primer;

(x) repeating steps (a)-(u) a plurality of turns so as to construct a plurality of framework, the plurality of framework each having a framework void;

(y) grounding exterior welds of the plurality of framework so that the exterior welds are flush with an external surface of the first end rail, the second end rail, the first side rail, and the second side rail of the plurality of framework; and (z) coating the plurality of framework with an epoxy primer.

9. The method for constructing at least one framework to form a modular ornamental structure of claim 8 further comprising the steps of:

(a) mounting hingedly a door to a vertical sidewall of a second end rail of one framework of the plurality of framework, the door occupying a space provided by the framework void of the one framework;

(b) positioning a remainder of the plurality of framework flatly on a flat, horizontal support surface;

(c) applying a bond breaker release agent to an external surface of each the remainder of the plurality of framework;

(d) pouring a concrete mixture into the framework void of each the remainder of the plurality of framework to a depth being approximately level with an upper surface of each the remainder of the plurality of framework;

(e) tamping and vibrating the concrete mixture in order to ensure the concrete mixture is consolidated;

(f) leveling the concrete mixture;

(g) floating the concrete mixture to remove water from an upper surface thereof;

(h) edging and troweling the concrete mixture;

(i) applying a color hard colorant to the upper surface of the concrete mixture using a dry shake method;

(j) repeating step (i) until the upper surface of the concrete mixture is sufficiently covered by the color hard colorant;

(k) troweling the upper surface of the concrete mixture to a smooth, even finish;

(l) applying a release agent to an impression side of an impression mat during an initial set phase of the concrete mixture;

(m) positioning the impression side of the impression mat atop the upper surface of the concrete mixture;

(n) walking on and tamping the impression mat in order to transfer a detail imprint provided by the impression side of the impression mat to the upper surface of the concrete mixture so as to create an ornamental panel;

(o) removing the impression mat so as to reveal the ornamental panel;

(p) maintaining the ornamental panel in an immobilized position for a period extending approximately two to three days;

(q) applying a color wash solution to an upper surface of the ornamental panel in order to develop and form an antiqued surface; and (r) applying a liquid sealer to the antiqued surface.

10. The method for constructing at least one framework to form a modular ornamental structure of claim 9 further comprising the steps of:

(a) tack welding the plurality of framework to one another along a vertical, outer side edge, or along the first end rail and the second end rail of each the plurality of framework in a manner which securably interconnects the plurality of framework so as to form a closed plane rectangularly shaped structure;

(b) aligning vertically and positioning corner posts in a snug fit mating relationship against each L-shaped recess of the closed plane rectangularly shaped structure;

(c) tack welding each of the corner posts to the respective L-shaped recesses respectively;

(d) disposing a cooking grid atop the closed plane rectangularly shaped structure;

(e) mounting hingedly a cover to a pair of corner posts, the cover comprising a plurality of exhaust outlets from which exhaust tubes integrally extend; and (f) applying two coats of a urethane coating composition to the plurality of framework, the door, each of the corner posts, the cover, and the exhaust tubes.

* * * * *